United States Patent [19]
Konstantin

[11] 3,974,628
[45] Aug. 17, 1976

[54] BANDING MACHINE

[76] Inventor: Anatole Ethan Konstantin, 10 Live Oak Road, Norwalk, Conn. 06851

[22] Filed: Nov. 11, 1975

[21] Appl. No.: 630,906

[52] U.S. Cl. ............................... 53/291; 53/198 R; 53/297
[51] Int. Cl.² ......................................... B65B 13/16
[58] Field of Search ............ 53/291, 293, 294, 295, 53/296, 297, 198 R

[56] References Cited
UNITED STATES PATENTS

| | | | |
|---|---|---|---|
| 2,660,353 | 11/1953 | Gampp | 53/291 X |
| 3,313,090 | 4/1967 | Kerrigan | 53/291 X |

Primary Examiner—Travis S. McGehee

[57] ABSTRACT

A machine for placing a band of shrinkable plastic film over one or more objects to be banded, comprising:

1. means for dispensing shrinkable flattened plastic tubing,
2. means for opening a section of said flattened tubing and for reflattening the opened tubing in a plane perpendicular to its initial plane,
3. means for feeding a preselected length of said reflattened tubing into position for being cut, and
4. means for cutting said preselected length of reflattened tubing into a band, and the improvement comprising:
5. means for grasping said band and placing it over said object, comprising a plurality of elongated parallel fingers capable of coordinated linear motion in the direction of the longitudinal axis of the fingers and lateral or transverse motion, thereby enabling said fingers (a) to contract sufficiently to enter inside the band before it is cut from the tube, (b) to expand against the inside surface of the band to open it fully and to grasp it before or as the band is cut, (c) to place the expanded band around said object, and thereafter (d) to contract sufficiently to slip out from inside the band, leaving the band positioned around said object.

10 Claims, 6 Drawing Figures

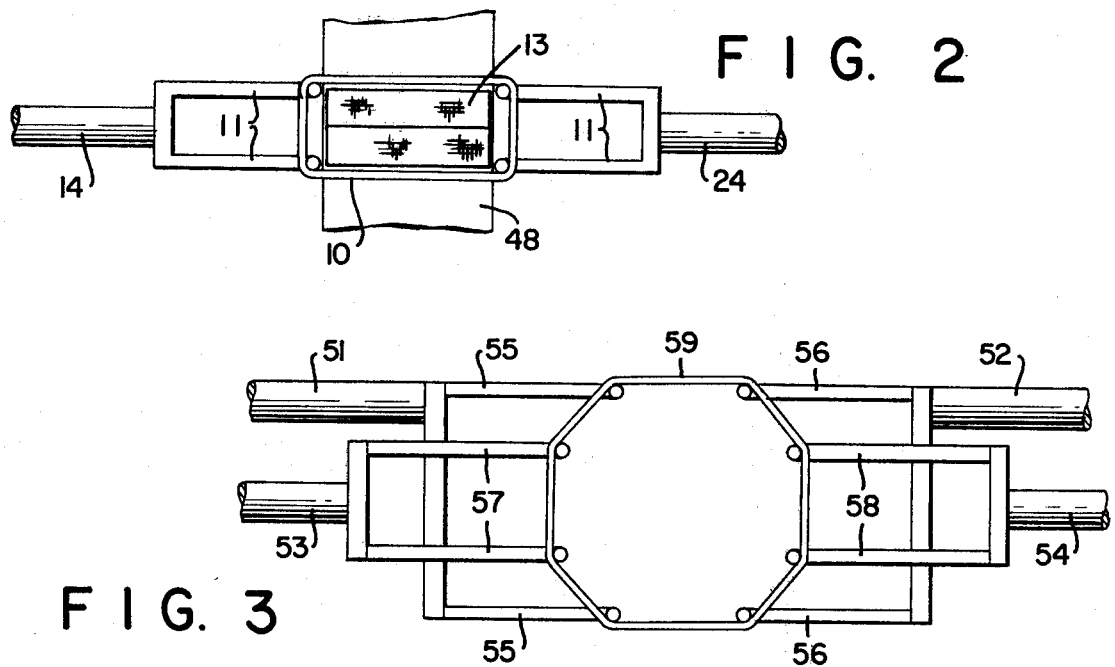

3,974,628

BANDING MACHINE

BACKGROUND

This invention relates to apparatus for placing a band of shrinkable plastic film over one or more objects southt to be banded. After the band has been placed over the object or objects it is shrunk to fit tightly.

The use of plastic neck bands of shrinkable plastic film for sealing bottles of medicine, toiletries, foodstuff and beverages is well known. In addition to serving as tamper proof or secondary seals, such bands may also be used to fasten two or more articles or objects together, or to fasten a label to an article. The bands may be made of any suitable transparent or opaque plastic film which can be shrunk to form a tight fitting seal around the object or objects sought to be banded. Although films which shrink upon coming in contact with moisture are known, the preferred materials are heat shrinkable films of, for example, polyolefin or polyvinylchloride (PVC).

Machines for placing bands of shrinkable film over bottles and the like are known. Conventionally, such machines include a conveyor which carries the bottles to the banding station. There the banding machine places a heat shrinkable band over the neck of the bottle, after which the conveyor carries the bottle through a tunnel heater which causes the film to shrink tightly around the object to be banded.

Depending on their specific use, banding machines must be capable of placing the bands over the objects accurately and at a rate of speed sufficient to keep pace with other packaging operations, since shut down of the banding machine, for even a relatively short period of time, will cause substantial disruption of continuous filling and packaging operations. Prior art machines tend to jam, to place the bands in an inaccurate manner, and to be too slow. Furthermore, since shrink-tubing, from which the individual bands are usually cut, is normally supplied in coils of flattened tubing crimped at the two edges, a persistent problem in the prior art has been to keep the bands open and properly aligned with the objects to be banded. These problems grow more acute as the film gets thinner and the bands get wider in diameter.

It is therefore an object of this invention to provide apparatus capable of placing bands of thin shrinkable film over an object rapidly and dependably.

SUMMARY OF THE INVENTION

The above and other objects which will be apparent to those skilled in the art, are achieved by the present invention, which comprises:

in apparatus for placing a band of shrinkable plastic film over an object to be banded, comprising in combination:

a. means for feeding shrinkable plastic tubing, flattened in a first plane, b. means for opening a section of said flattened tubing and for reflattening the opened tubing in a plane perpendicular to said first plane, c. means for feeding a preselected length of said reflattened tubing into position for being cut, d. means for cutting said preselected length of reflattened tubing into a band, and e. the improvement comprising: means for grasping said band and placing it over said object, comprising a plurality of elongated parallel fingers capable of coordinated linear motion in the direction of the longitudinal axis of the fingers and transverse or lateral motion, thereby enabling said fingers (1) to contract sufficiently to enter inside the band before it is cut from the tube, (2) to expand against the inside surface of the band to open it fully and to grasp it before or as the band is cut from the tube, (3) to place the expanded band around said object, and thereafter (4) to contract sufficiently to slip out from inside the band, leaving the band positioned around said object.

In a preferred embodiment of the invention, the linear motion of the fingers is provided by crank driven slide means, and the expanding and contracting, i.e. lateral motion of the fingers is provided by rotary cam driven linear cam means.

The apparatus described above is used in cooperation with conventional means for conveying the objects to be banded first to their banding position, and after they have been banded to conventional means for shrinking the bands.

Band stopping means may also be used. Such means may comprise a pallet, nest or support under the object, clamping means or other suitable means to stop the linear travel of the band such as a part of the object itself.

Although for purposes of brevity the term, "object" is used throughout the specification and claims, it is to be understood that the term is intended to include one or more objects. For example, the object to be banded may be the cap of a jar or other container, one or more articles to be bound tightly together by the band, an article and a label, or an article banded to a display card. A band may enclose an article entirely, thereby rendering the article tamper-proof, dust-free, moisture-proof, vapor impervious or electrically insulated, depending upon the nature of the film and the extent to which the article is encased by the shrunken band.

THE DRAWINGS

FIG. 2 is a top view illustrating how four mechanical fingers of the present apparatus hold a band in a rectangular position for placing it over a rectangular object.

FIG. 3 is a top view of a four armed, eight fingered machine in accordance with the present invention, holding the band in an octagonal shape.

FIG. 4 is a top view of an other fingering arrangement by which the apparatus of the present invention is capable of holding the band in an asymetrical fashion.

FIG. 5 illustrates an alternative form of a band shaping aperture shown in FIG. 1.

DETAILED DESCRIPTION

Figure 1:
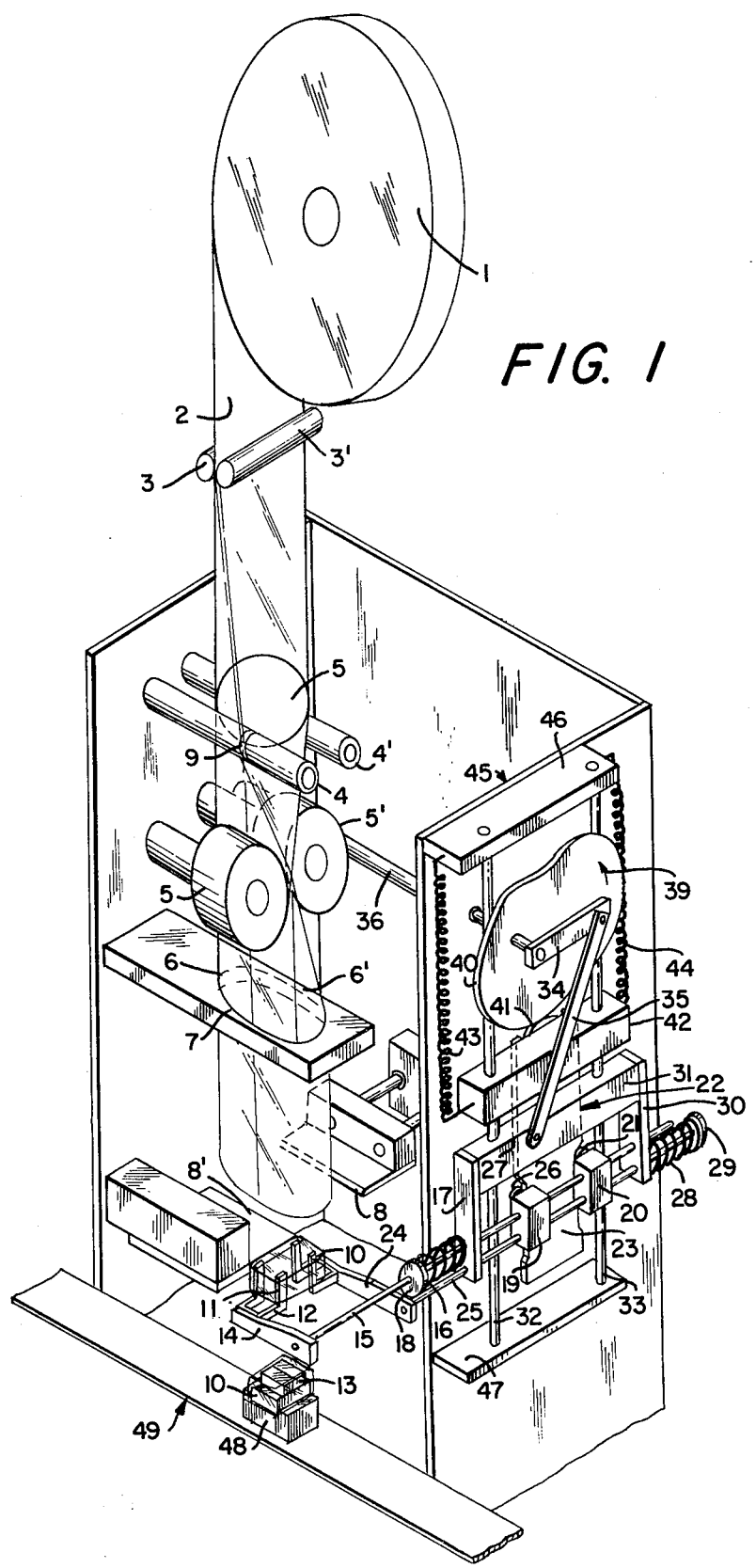
FIG. 1 is a perspective view, illustrating a preferred embodiment of the present invention.

In order to gain a better understanding of the present invention, reference is made to the drawings, in which FIG. 1 illustrates a banding machine embodying the present invention. Dispenser 1 contains a reel of flattened PVC or other type of plastic tubing 2 which is threaded, first through a pair of guide rollers 3 and 3', and then through a tubing opener consisting of a pair of parallel rollers 4 and 4' mounted so that the space between them lies in a plane perpendicular to the plane in which the flattened tubing 2 lies as it is uncoiled from the dispenser 1. Rollers 4 and 4' may each contain a groove 9 around the rollers. This helps to keep the tubing in place by having the crimped edges of the tubing ride in the grooves. A ball 5, placed inside tubing 2 rests on rollers 4 and 4'. Next, tubing 2 is reflattened in the plane opposite to its originally crimped plane by driven pinch rollers 5 and 5' which are narrower than the width of the reflattened tubing 2. Since the pinch rollers 5 and 5' pull the tubing off the reel which offers some resistance, the tubing is placed in tension, and the edges 6 and 6' which are not contacted by the pinch rollers are pulled back more than at the point of contact by the rollers. This uneven tension on the tubing helps keep the end of the tubing below the pinch rollers open. To further help to keep the end of the tubing open, it is passed through a shaping orifice 7. The tubing tends to take the same shape as that of orifice 7. Pinch rollers 5 and 5' feed the tubing through a cutting slit which consists of a driven knife edged blade 8 and a stationary mating blade 8'.

Just before band 10 is severed from the tubing 2, the four elongated parallel fingers 11 contract sufficiently to slip inside band 10, and then spring open to fully expand the band as or immediately after it is severed. Band 10 thus rests on the horizontal portion 12 of fingers 11. The parallel relationship of fingers 11 is maintained as they expand and contract laterally. The lateral motion of the fingers is coordinated with their linear motion, as well as synchronized with revolution of the tube feed rollers 5 and 5', cutting blades 8 and 8', and the conveyor 49 which moves the object to the banding station and after banding to a shrink tunnel (not shown). The bands may be preshrunk after placement around the objects to be banded simply by blowing hot air on them before final shrinking in a tunnel heater.

The two left fingers are attached to left arm 14, which in turn is fixedly attached to rod 15. Compression spring 16 located between slide arm 17 and fixed spring stop 18 exerts a force to keep the two left fingers fully extended to the left. Rod 15 slides back and forth through a drilled holes in block 19 and in arms 17 and 30; being fixedly attached to block 20. Block 20 is provided with a cam follower 21 which is in rotary riding contact with the right edge 22 of linear cam 23. As cam follower 21 travels up and down in contact with edge 22, it will determine the lateral motion of the left arm 14 (and the fingers attached to it) with the extent of travel depending on the width of linear cam 23. In like manner, the right arm 24 and the fingers attached to it are controlled in their lateral motion by the left edge 27 of cam 23. Arm 24 is fixedly attached to rod 25 which slides through drilled holes in arms 17 and 30 and in block 20; being fixedly attached to block 19. Rotary cam follower 26 affixed to block 19 is held in riding contact with edge 27 by compression spring 28 which exerts force against arm 30 and fixedly attached spring stop 29. Hence, as cam 23 becomes wider, both the left and right sets of fingers are caused to contract, i.e. move towards each other; while as cam 23 narrows, the springs 16 and 28 cause the fingers to separate or expand.

Both rods 15 and 25 are held in place by slide arms 17 and 30, which in turn are attached to horizontal slide bar 31. Slide bar 31 rides up and down on rods 32 and 33 by the motive force provided by drive shaft 36 which is attached to slide bar 31 through pivotally linked crank arms 34 and 35. Arrow 37 indicates the direction in which drive shaft 36 turns both the crank arm 34, as well as the rotaty cam 40, both of which are fixedly attached to the drive shaft.

Cam 40 is in rotary contact with cam follower 41 which is mounted on the linear cam 23. The latter is fixedly attached to horizontal slide bar 42 which rides up and down on rods 32 and 33. Slide bar 42 is held in rotary contact with cam 40 by tension springs 43 and 44. Rotation of cam 40 causes the linear cam 23 to move in the vertical direction in synchronization with the vertical movement of slide bar 31. Rods 32 and 33 are fixedly attached to housing 45 by mounting plates 46 and 47.

In operation, the bander shown in FIG. 1 functions as follows. Drive rolls 5 and 5' advance a preselected length of tubing 2 through aperture 7 and the cutting mechanism. Fingers 11, in contracted position, slip inside the tube and spring open as band 10 is severed by blades 8 and 8'. The arms 14 and 24 then move down until band 10 is placed over the object 13 to be banded. With the band 10 coming to rest on pallet 48, the fingers contract slightly and slip downward out from under the band; then open sufficiently to clear the banded object and return to pick up the next band. The movement of the tubing drive rolls, the cutter and the conveyer 49 which brings each successive object to the banding position and after banding moves it to a tunnel heater (not shown) to shrink the band tightly around the banded objects are coordinated to function in timed sequence with movement of the fingers.

FIG. 2 is a top view illustrating how four fingers 11 are used to hold band 10 in an open rectangular position enabling it to be easily placed over a rectangular object 13 consisting here of two rectangular boxes to be banded together. The fingers are operatively connected through arms 14 and 24 to spring means (not shown in FIG. 2) which keep the fingers and consequently the band fully open, yet in a flexible manner so as not to break the band.

FIG. 3 illustrates a four armed mechanism for holding a band open in an octagonal shape, convenient for placing the band over a circular object. Arms 51 and 52 are attached respectively to fingers 55 and 56, while arms 53 and 54 are attached respectively to fingers 47 and 58. While it would, of course, be possible to attach all four fingers on each side to one arm rather than two as shown, the four arm arrangement permits the fingers to contract to a linear arrangement which allows them to enter a band which is only slightly open. This is made possible by the fact that the lower set of arms 53 and 54 can move closer together and further apart than the upper set 51 and 52. Such operation requires a duplicate mechanism or set of rotary and linear cam drives of the type shown in FIG. 1 to control the motion of the second set of arms.

FIG. 4 illustrates the versatility of the invention wherein a still different arrangement of band holding fingers 61, attached to left arm 62 and right arm 63, produce an unsymmetrical, nine sided band 64 around a circular object 65. Numerous other arrangements of the fingers will readily be apparent to those skilled in the art.

FIG. 5 illustrates an alternative shape forming aperture 71 in the form of a "figure 8". It has been found, particularly with large bands of thin film, that the bands tend to collapse, making it difficult for the fingers to enter inside the band during high speed operation of the machine. Various shaping apertures such as shown in FIG. 5 help to shape and hold the band 72 in the same configuration as the shape of the aperture, creating spaces inside the band into which appropriately located fingers are easily fitted. If desirable, suction holes may be drilled in the sides of the shape forming aperture to help pull the film into conformation with the shape of the aperture. Reciprocating suction cups could be used for the same purpose. Alternatively, air may be blown upwards into the tube to help keep it open.

It has been found that keeping the fingers properly aligned with the object as the band is about to be placed over the object is very important for rapid trouble-free operation of the machine. Alignment of the fingers, in the embodiment shown in FIG. 1, depends upon the forces produced by springs 16 and 28 being equal. When the fingers are restrained by a band, the cam followers 21 and 26 may not be in contact with the edges 22 and 27 of cam 23. If springs 16 and 28 are unequal in force, the fingers together with bands will shift off center relative to the object 13. Due to the large number of rapid compression cycles to which these springs are subjected during normal operation of the apparatus, the springs tend to become fatigued, and may weaken unevenly causing the banded fingers to become misaligned with the object to be banded. The position equalization mechanism shown in FIG. 6 overcomes this problem.

Figure 6:
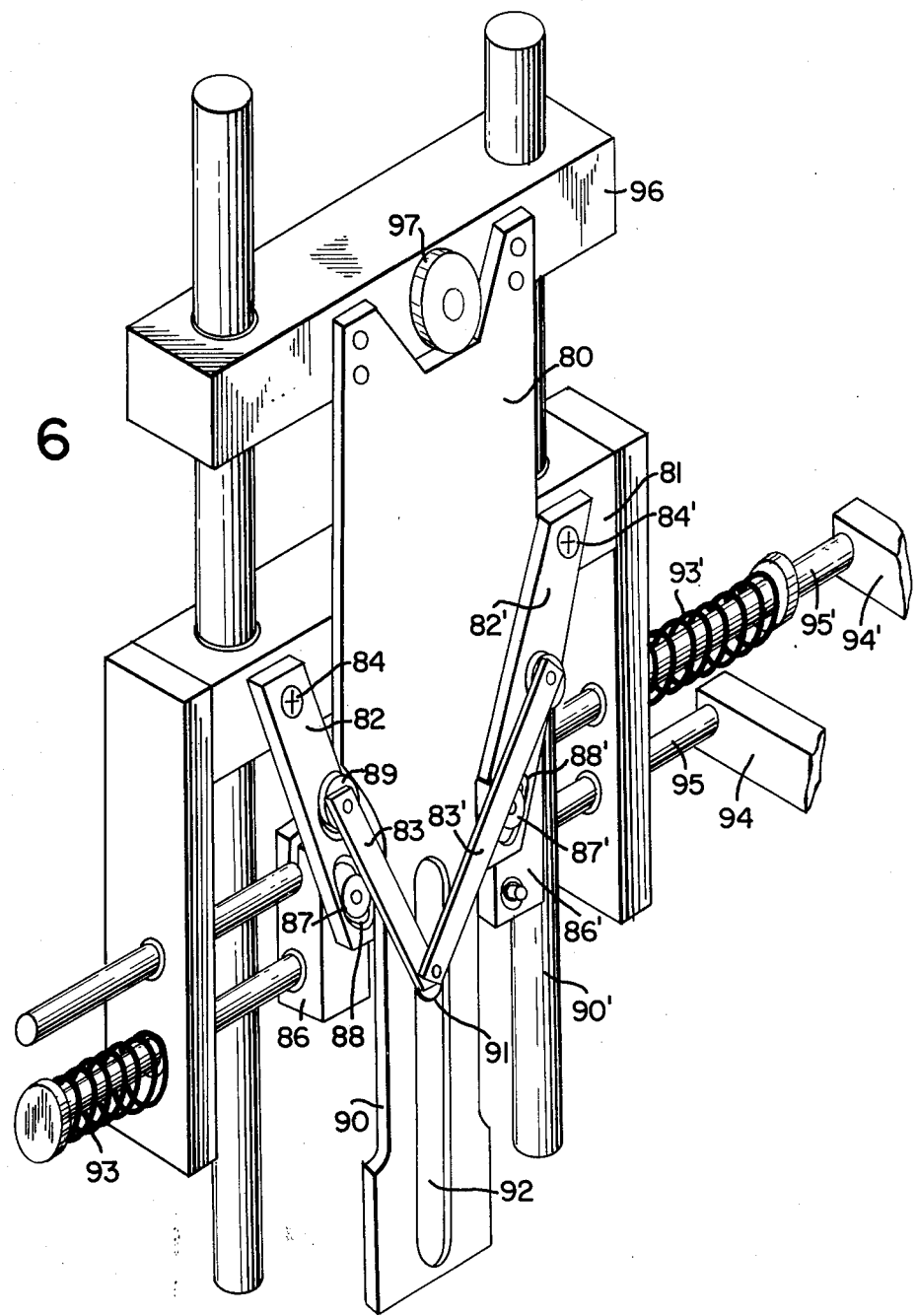
FIG. 6 illustrates a preferred mechanism for keeping the fingers with the band on them in alignment with the object to be banded.

FIG. 6 is a back view compared to the view shown in FIG. 1. The problem is misalignment of the fingers with the object to be banded is solved by keeping the blocks 86 and 86' equidistant from the center line of cam 80. Linear cam 80 is connected to slide bar 81 through a left arm and right set of linkage arms 82 and 82' and 83 and 83'. Arms 82 and 82' are pivotally attached at their upper ends at 84 and 84' to slide bar 81, and at their lower ends to blocks 86 and 86' respectively by cam followers 87 and 87' which ride in oval slots 88 and 88' in the arms. Link arms 82 and 82' are each attached to cam followers 89 and 89' which contact the respective edges 90 and 90' of cam 80 when the lateral motion of the fingers (not shown) is not restricted by a band, but which may not contact the edges 90 and 90' when the fingers are restricted by a band. The second set of link arms 83 and 83' are pivotally attached to the center sections of arms 82 and 82' at their upper ends, and pivotally to a centering cam follower 91 at their lower ends. Cam follower 91 rides up and down in the centering slot 92. This linkage compensates for any inequality in the forces exerted by springs 93 and 93' which may develop by weakening of either spring, and hence keeps the fingers (not shown) attached to arms 94 and 94' through rods 95 and 95' centered over the object to be banded. The linear cam 80 is fixedly attached at its upper end to slide bar 96, which is in rotary contact through cam follower 97 with a rotary cam (not shown) as in FIG. 1.

What is claimed is:

1. In apparatus for placing a band of shrinkable plastic film over an object to be banded, comprising in combination:

a. means for dispensing shrinkable plastic tubing, flattened in a first plane,
b. means for opening a section of said flattened tubing and for reflattening the opened tubing in a plane perpendicular to said first plane,
c. means for feeding a preselected length of said reflattened tubing into position for being cut,
d. means for cutting said preselected length of reflattened tubing into a band, and
e. the improvement comprising: means for grasping said band and placing it over said object, comprising a plurality of elongated parallel fingers capable of coordinated linear motion in the direction of the longitudinal axis of the fingers and lateral motion, thereby enabling said fingers (1) to contract sufficiently to enter inside the band before it is cut from the tube, (2) to expand against the inside surface of the band to open it fully and to grasp it before or as the band is cut, (3) to place the expanded band around said object, and thereafter (4) to contract sufficiently to slip out from inside the band, leaving the band positioned around said object.

2. The apparatus of claim 1 wherein the linear motion of the fingers is provided by crank driven slide means, and wherein the lateral motion of the fingers provided by rotary cam driven linear cam means.

3. The apparatus of claim 1 wherein a tube shaping orifice is disposed between said tube feeding means and said tube cutting means for helping to keep said tube in an open position.

4. The apparatus of claim 1 wherein said means for feeding said tubing comprises a pair of rollers having a width less than the width of said tubing when flattened, thereby placing uneven tension on said tubing causing it to open.

5. The apparatus of claim 1 in combination with means for conveying said objects first to their banding position, and after having been banded to means for shrinking said bands.

6. The apparatus of claim 1 wherein said fingers are connected to one set of arms, said set consisting of two arms, each arm being provided with two fingers disposed in a configuration such that the fingers on expansion form the corners of a four sided polygon.

7. The apparatus of claim 1 wherein said fingers are connected to two sets of arms, each set consisting of two arms, each arm being provided with two fingers, such that the fingers in the expanded position form the corners of an octagon.

8. The apparatus of claim 2 wherein said fingers are maintained in contact with said linear cam means by spring loaded linking means.

9. The apparatus of claim 8 provided with means for centering the fingers with respect to the object to be banded comprising means for compensating for any inequality in the forces exerted by said spring loaded linking means.

10. The apparatus of claim 9 wherein said means for centering comprises linking arms which pivotally attach said spring loaded linking means to said linear cam at locations along its center line.

* * * * *